(12) United States Patent
Van Hameren

(10) Patent No.: US 9,328,252 B2
(45) Date of Patent: May 3, 2016

(54) INK COMPOSITION

(71) Applicant: OCE-TECHNOLOGIES B.V., Venlo (NL)

(72) Inventor: Richard Van Hameren, Herten (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/846,337

(22) Filed: Sep. 4, 2015

(65) Prior Publication Data

US 2015/0376431 A1    Dec. 31, 2015

Related U.S. Application Data

(63) Continuation of application No. PCT/EP2014/053863, filed on Feb. 27, 2014.

(30) Foreign Application Priority Data

Mar. 7, 2013    (EP) ..................... 13158157

(51) Int. Cl.

| G01D 11/00 | (2006.01) |
|---|---|
| C09D 11/38 | (2014.01) |
| C09D 11/14 | (2006.01) |
| C09D 11/322 | (2014.01) |
| C09D 103/02 | (2006.01) |
| C09D 175/06 | (2006.01) |

(52) U.S. Cl.
CPC ............... *C09D 11/38* (2013.01); *C09D 11/14* (2013.01); *C09D 11/322* (2013.01); *C09D 103/02* (2013.01); *C09D 175/06* (2013.01)

(58) Field of Classification Search
None
See application file for complete search history.

(56) References Cited

U.S. PATENT DOCUMENTS

| 5,681,380 | A | 10/1997 | Nohr et al. | |
|---|---|---|---|---|
| 2003/0177948 | A1* | 9/2003 | Ohkawa | C09B 67/0069 106/31.86 |
| 2003/0187095 | A1* | 10/2003 | Cornish | A01N 47/44 523/122 |
| 2005/0200905 | A1* | 9/2005 | Kimura | B41J 2/21 358/3.27 |
| 2008/0199523 | A1* | 8/2008 | Finnie | A01N 25/28 424/484 |
| 2012/0073468 | A1 | 3/2012 | Koganehira et al. | |
| 2012/0227619 | A1 | 9/2012 | Koganehira et al. | |
| 2012/0227620 | A1 | 9/2012 | Koganehira et al. | |

FOREIGN PATENT DOCUMENTS

EP    0 812 888 A2    12/1997

OTHER PUBLICATIONS

International Search Report issued in PCT/EP2014/053863 dated Sep. 5, 2014.
Written Opinion of the International Searching Authority issued in PCT/EP2014/053863 dated Sep. 5, 2014.

* cited by examiner

*Primary Examiner* — Erica Lin
(74) *Attorney, Agent, or Firm* — Birch, Stewart, Kolasch & Birch, LLP

(57) ABSTRACT

The invention relates to an ink composition comprising a pigment, an aqueous vehicle, a host compound having a cavity and a surface active agent, wherein the surface active agent is capable of binding to the cavity of the host compound.

The invention further relates to a method for preparing such ink compositions and to a method for applying an image onto a receiving medium using such ink composition.

4 Claims, 4 Drawing Sheets

Dynamic surface tension

INK COMPOSITION

CROSS-REFERENCE TO RELATED APPLICATIONS

This application is a continuation of International Application No. PCT/EP2014/053863, filed on Feb. 27, 2014, and for which priority is claimed under 35 U.S. C. §120. PCT/EP2014/053863 claims priority under 35 U.S. C. §119(a) to application Ser. No. 13/158,157.1, filed in Europe on Mar. 7, 2013. The entire contents of each of the above-identified applications are hereby incorporated by reference into the present application.

FIELD OF THE INVENTION

The present invention relates to an ink composition. The present invention further relates to a method of preparing said ink composition. The present invention also relates to a method for providing an image onto a receiving medium.

BACKGROUND OF THE INVENTION

Aqueous inks for ink jet are known in the art. Such inks typically comprise an aqueous vehicle and a water dispersible colorant. Ink jetting involves a number of stages, for example jetting of a droplet of the ink composition, landing of the droplet on a receiving medium, spreading of the droplet on the receiving medium and drying of the droplet. Ideally, an ink composition performs well in all stages of the ink jetting process. However, in practice this is often not the case. One of the reasons for this is the optimal properties of an ink composition may differ per stage of the inkjet process. For example, the optimum value of the surface tension may differ per stage. When jetting a droplet of the ink composition, the surface tension is preferably high, which may e.g. be beneficial for the non-wetting behavior of the nozzle surface of the print head. When the droplet is spreading on the receiving medium, the surface tension is preferably low, since a low surface tension may improve droplet spreading. It is known to tune the surface tension of an ink composition by adding one or more surface active agents. A surface active agent may modify the surface tension of the ink composition. However, when a surface active agent is added to an ink composition, the surface tension of the ink composition will be changed, irrespective of the stage of ink jetting. It is therefore an object of the invention to provide an ink composition, wherein the surface tension may be optimized for different stages of the ink jetting process.

SUMMARY OF THE INVENTION

The objects of the invention are at least mitigated in an ink composition for applying an image onto a receiving medium, said receiving medium comprising a hydrophobic surface, the ink composition comprising a pigment, an aqueous vehicle, and
  a host compound, which is soluble or dispersible in the aqueous vehicle and has a cavity capable of hosting a guest compound;
  a surface active agent, having a first part and a second part, wherein the first part has an affinity towards the cavity of the host compound and is capable of forming a host-guest complex with the host compound and wherein the second part has a hydrophobic character and an affinity towards the hydrophobic surface of the receiving medium, wherein the affinity of the second part towards the hydrophobic surface of the receiving medium is higher than the affinity of the first part towards the cavity of the host compound.

Colorant

The ink composition may comprise a colorant. The colorant may be a pigment or a mixture of pigments or a mixture comprising pigments and dyes.

In a preferred embodiment, the colorant is a pigment. Pigments may provide the ink with improved weatherability, compared to dyes. The pigment is not particularly limited and may be suitably selected in accordance with the intended use.

Examples of the pigment usable in the present invention include those commonly known without any limitation, and either a water-dispersible pigment or an oil-dispersible pigment is usable. For example, an organic pigment such as an insoluble pigment or a lake pigment, as well as an inorganic pigment such as carbon black, may be used. The pigment may be a self dispersible pigment, or may be a pigment dispersed using a suitable dispersant, as is known in the art.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, and aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2, C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101(colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

Aqueous Vehicle

The aqueous vehicle may comprise at least water. Water is an environmentally friendly and hence desirable solvent. In the present invention, the content of water of the whole ink is preferably from 20 weight % to 80 weight %. It is more preferable that the content of water is from 30 weight % to 75 weight %, even more preferable from 40 weight % to 70 weight %.

The aqueous vehicle dissolves or disperses the functional components of the ink, such as the water-dispersible colorant and the surface active agent.

Preferably, the aqueous vehicle may comprise at least one co-solvent.

Cosolvent

The aqueous vehicle of the ink composition preferably comprises a water soluble organic solvent in addition to water, which may function as the co-solvent. As long as the formation of a host guest complex between the host compound and the surface active agent is not hindered by the co-solvent, there is no restriction in particular in the type of the water soluble organic solvent. The co-solvent may improve the ejection property of the ink or adjusting the ink physical properties, for example. The co-solvent may assist in stabilizing the particles dissolved and/or dispersed in the aqueous vehicle, such as the water-dispersible colorant.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylolpropane, diglycerol (diglycerin), trimethylglycine (betaine), N-methylmorpholine N-oxide, decaglycerol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol monopropyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol, 1,2-butanediol, 1,2,3-butanetriol, 1,2,4-butanetriol, 1,2-propanediol, 1,6-hexanediol, 1,5-hexanediol and triethylphosphate.

The water-soluble organic solvents may retain a large amount of water therein even when left at rest in the open air, thereby imparting flowability to the ink composition.

Particularly preferred co-solvents are glycerin and 1,3-butanediol because when these materials contain water, the viscosity of these substances decreases, and the pigment dispersion can be stably maintained without aggregation.

In an embodiment, a mixture of the water-soluble organic solvents may be comprised in an ink composition according to the present invention. The individual organic solvents preferably being present in an amount of 1 weight % to 50 weight %, more preferably in an amount of 1 weight % to 40 weight %, even more preferably in an amount of 1 weight % to 25 weight %, relative to the total ink composition.

Preferably, the ink composition is essentially free of co-solvents having an affinity towards the cavity of the host compound and being capable of forming a host-guest complex with the host compound. Such co-solvent may compete with the surface active agent to bind to the cavity of the host compound. In such case, the host compound may not be capable anymore of accommodating the surface active agent in its cavity. In the context of the present invention, the term "the ink composition is essentially free of co-solvents having an affinity towards the cavity of the host compound and being capable of forming a host-guest complex with the host compound" means that at most 10% of the host compound, preferably at most 5% of the host compound, more preferably at most 2% of the host compound, is not available for accommodating a surface active agent and/or is not already accommodating a surface active agent. Generally, host-guest complex are formed reversibly. The equilibrium depends on the one hand on the concentrations of the host compound and the compounds having an affinity towards its cavity and on the other hand of the relative binding strengths of the compounds having an affinity towards the cavity of the host compounds to the cavity of the host compound. Which co-solvents may have an affinity towards the cavity of the host compound depends on the nature of the host compound.

Examples of co-solvents that may have an affinity towards the cavity of a cyclodextrine compound are co-solvents comprising at least one 5-membered or 6-membered rings, such as 2-pyrrolidone, benzene, toluene, sugars or sugar derivatives, such as glucose, fructose, isosorbide, sorbitol or water soluble alkediols or alkanetriols, such as 1,2-hexanediol, 1,6-hexanedion or 1,2-pentanediol.

Host Compound

Host compounds are compounds capable of binding certain types of molecules. Such molecules are also known as guest molecules. The host compound may bind the guest molecule in a non-covalent manner. Upon binding of the guest molecules, a host guest complex may be formed. Since the guest molecule may be bound to the host compound in a non-covalent manner, the resulting host-guest complex may be a supramolecular complex. In the supramolecular complex, the guest molecule and the host compound may be bound using one or more of the following interactions: electrostatic interactions, such as dipole-dipole interactions or ion-dipole interactions; hydrogen bond, π-π stacking, Van der Waals forces and hydrophobic interactions. The binding of the guest molecule to the host compound may be reversible.

The host compound may comprise a cavity, to which the guest molecule may bind. The host compound may be soluble or dispersible in the aqueous vehicle of the ink composition. Preferably, the host compound is soluble in the aqueous vehicle.

Examples of host compounds are calixarenes, cyclophanes, carcerands or cyclic sugar derived compounds, e.g. cyclodextrines.

In an embodiment, the host compound is a cyclic sugar derivative. Sugar based components, such as cyclic sugar derivatives, are bio-based components, which are beneficial from an environmental point of view. Moreover, sugar based components are generally soluble in water and aqueous solutions and thus, cyclic sugar derivatives are suitable to be used in aqueous solutions, such as ink compositions comprising an aqueous vehicle. Because of the cyclic structure of these compounds, a cavity may be present in the interior of the cycle. The ink composition may comprise a surface active agent that has an affinity towards the cavity of the cyclic sugar derivative. Hence, the cyclic sugar derivative and the surface active agent may form a host-guest complex.

In a further embodiment, the cyclic sugar derivative is a cyclodextrine compound. Cyclodextrines are cyclic compounds, i.e. cyclic oligosaccharides. Cyclodextrines form a basic skeleton formed by bonding a plurality of α-1,4 linked α-D-glucopyranose units. Optionally, the α-D-glucopyranose units may comprise one or more substituents, such as alkyl substituents, hydroxyl alkyl substituents, polymer substituents, sugar substituents or sugarpolymer substituents. Examples of alkyl substituents are methyl, ethyl, propyl, butyl, etc. Examples of hydroxyl alkyl substituents are methoxy, ethoxy, propoxy, butoxy, etc. Examples of polymer substituents are polyether, polyester and poly-THF substituents. In the context of the invention, cyclodextrines include both non-substituted cyclodextrine molecules and substituted cyclodextrines. Cyclodextrines consisting of 6 glucose molecules are known as α-cyclodextrines; cyclodextrines comprising 7, 8 or 9 glucose molecules are known as β-cyclodextrines, γ-cyclodextrines and δ-cyclodextrines, respectively.

The cyclodextrines have a structure, wherein a cavity is formed. The cavity has a lipophilic nature. The outer surface of the cyclodextrine is hydrophilic. Because of this hydrophilic outer surface, cyclodextrines are water soluble.

In this lipophilic cavity, small molecules, such as a surface active agent, can bind. The size of the cavity depends on the number of α-D-glucopyranose units that form the cyclodextrine. For example, the cavity of an α-cyclodextrine is smaller than the cavity of a β-cyclodextrine, which is smaller than the cavity of a γ-cyclodextrine, etc. The optimal size of the cavity depends on the size of the surface active agent to be bound.

Surface Active Agent

The ink may comprise at least one surface active agent. Surface active agents are also known in the art as surfactants. The addition of a surface active agent to the ink composition may influence the surface tension of the ink composition. In particular, addition of a surface active agent to the ink composition may lower the surface tension of the ink composition. The surface tension may influence the behavior of the ink. It may influence the behavior of the ink in the print head and during jetting, and it may also influence the behavior of the ink after a droplet of ink has landed onto the receiving medium. When jetting droplets of an ink composition, the surface tension is preferably in the range of from 30 mN/m to 100 mN/m When the ink has landed on the receiving medium, the surface tension is preferably in the range of from 3 mN/m to 50 mN/m.

The surface active agent in accordance with the present invention may be a compound comprising a first part having an affinity towards the cavity of the host compound and being capable of forming a host-guest complex with the host compound and having a second part having a hydrophobic character and an affinity towards the hydrophobic surface of the receiving medium, wherein the affinity of the second part towards the hydrophobic surface of the receiving medium is higher than the affinity of the first part towards the cavity of the host compound. Optionally, the surface active agent may comprise further parts.

Preferably, the first, second and optionally further parts are covalently bonded to one another, thereby forming one molecule.

The first part of the surface active agent has an affinity towards the cavity of the host compound. By bonding between the first part of the surface active agent and the cavity, a host guest complex may be formed between the host compound and the surface active agent. The first part may comprise e.g. aromatic groups for interaction via π-π stacking to the cavity, the first part may comprise e.g. a hydrogen bond donor or acceptor group for forming hydrogen bonds with the cavity or the first part may comprise a hydrophobic part for having hydrophobic interactions with the cavity. When the surface active agent is bonded in the cavity, the surface active agent may not be capable of influencing, in particular lowering, the surface tension of the ink composition. A higher surface tension is beneficial when a droplet is still in the print head since it allows a more reliable droplet formation and prevents wetting of the nozzle plate.

The second part of the surface active agent may have an affinity towards the hydrophobic surface of the receiving medium. The second part of the surface active agent may be a hydrophobic part, such as an alkyl group, an aryl group or an alkylaryl group.

The affinity of the second part towards the hydrophobic surface of the receiving medium may be higher than the affinity of the first part towards the cavity of the host compound. In the presence of the hydrophobic surface of the receiving medium, the surface active agent may bond, via its second part, to the hydrophobic surface. When the surface active agent binds to the hydrophobic surface, the concentration of the surface active agent in the bulk of the ink composition decreases, which shifts the equilibrium between the host compound and the surface active agent to the situation, wherein only little host-guest complex is present. By dissociating from the host compound, the surface active agent may regain its ability to influence, in particular lower, the surface tension of the ink composition at the solid liquid interface, such as the interface between the droplet of ink and the receiving medium.

Thus, by using an ink composition having a host compound and a surface active agent in accordance with the present invention, the surface tension at the solid-liquid interface may be lowered when the ink contacts the hydrophobic surface of the receiving medium. A lower surface tension at the solid-liquid interface is beneficial when a droplet of ink has just been applied onto the receiving medium, since a low surface tension improves droplet spreading. Droplet spreading is desired, because a more homogeneous coverage of the receiving medium can be obtained and coalescence between droplets may occur. As a consequence, the surface tension of the ink is adapted to the phase of the printing process.

Examples of surfactants are not specifically limited and include surfactants having hydrophobic and sterically accessible groups for binding. The surfactant may be a nonionic surfactant, a cationic surfactant, an anionic surfactant and an amphoteric surfactant.

In an embodiment, the ink composition further comprises a water-dispersible resin.

The presence of a water-dispersible resin in the ink composition may improve the pigment fixability to recording media. As the water-dispersible resin, a water-dispersible resin capable of film formation (image formation) and having high water repellency, high waterfastness, and high weatherability is useful in recording images having high waterfastness and high image density (high color developing ability).

Examples of the water-dispersible resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins, and combinations of the plural.

Examples of the natural polymer compounds include celluloses, rosins, and natural rubbers.

Examples of commercially available water-dispersible resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-26, NeoCryl XK-15, NeoCryl X-151, NeoCryl XK-232, NeoCryl XK-234, NeoCryl XK-237, NeoCryl XK-238- NeoCryl XK-86, NeoCryl XK-90 and NeoCryl XK-95 and polyester-polyurethane resins, such as Alberdingk® U 6100, U6150, U8001, U9150, U9370, U9380, U9700, U 9800, UC90, UC150, UC300, UC300 VP or UC310 resin obtainable from Alberdingk Boley GmbH. However, the water-dispersible resin emulsion is not limited to these examples.

The water-dispersible resin may be used in the form of a homopolymer, a copolymer or a composite resin, and all of water-dispersible resins having a monophase structure or core-shell structure and those prepared by power-feed emulsion polymerization may be used.

The content of the water-dispersible resin added in the ink of the present invention is preferably from 1-40 weight % based on the total weight of the ink, and it is more preferably from 1.5-30 weight %, and it is still more preferably from 2-25 weight %. Even more preferably, the amount of the water-dispersible resin contained in the inkjet ink, as a solid content, is 2.5 weight % to 15 weight %, and more preferably 5 weight % to 13 weight %, relative to the total ink composition.

The average particle diameter (D50) of the water-dispersible resin is preferably from 10 nm-1 µm, it is more preferably from 10-500 nm, and it is still more preferably from 20-200 nm, and especially preferably it is from 25-200 nm.

In addition, there are no specific restrictions to the particle size distribution of the polymer particles, and it is possible that the polymer particles have a broad particle size distribution or the polymer particles have a particle size distribution of monodisperse type.

In an embodiment, the ink composition according to the present invention comprises two or more water-dispersible resins selected from the above cited synthetic resins, synthetic copolymer resins and natural polymer compounds in admixture with each other.

In an embodiment, the surface active agent is selected from an alkylphenolethoxylate, wherein the alkyl group of the alkylphenolethoxylate comprises 6-30 C atoms. These alkylphenolethoxylates are suitable to be used as a surface active agent in ink compositions, such as latex ink compositions. Alkylphenolethoxylates are capable of lowering the surface tension of the ink compositions, which may improve the properties of the ink, e.g. the spreading of the ink composition onto a receiving medium. Alkylphenolethoxylates comprise a phenol moiety (—$C_6H_4O$—), which may be capable of reversibly binding to a host compound having a cavity. The phenol moiety may be referred to as the first part of the surface active agent in the context of the present invention. For example, alkylphenolethoxylates have an affinity to the cavity of cyclic sugar derivatives, such as cyclodextrines. Alkylphenolethoxylates are capable of reversibly binding to the cavity of a cyclodextrine and thereby forming a host-guest complex between the alkylphenolethoxylate and the cyclodextrine. When such host-guest complex is formed, the alkylphenolethoxylate may lose its surface tension lowering property, for as long as the alkylphenolethoxylate is bonded to the cavity of the host compound. Thus, when the alkylphenolethoxylate is bonded to the host compound, the alkylphenolethoxylate may (temporarily) not function as a surface active agent. Alkylphenolethoxylates furthermore comprise an alkyl group. The alkylgroup may be referred to as the second part of the surface active agent in the context of the present invention. This alkylgroup has a hydrophobic character. The hydrophobic alkylgroup may have an affinity towards other hydrophobic components or surfaces, such as a hydrophobic surface of a receiving medium. Examples of receiving media having a hydrophobic surfaces are vinyls, polyethylene (PE), polypropylene (PP), polyethylene terephthalate (PET), polyester receiving media and off-set coated papers.

The affinity of the alkylgroup towards the hydrophobic surface of the receiving medium may be higher than the affinity of the phenol moiety towards the cavity of the host compound, e.g. the cyclodextrine. The hydrophobic surface of the receiving medium is only present in proximity of the components of the ink compositions once the ink compositions have been applied onto the receiving medium. Thus, when the ink has been applied onto the receiving medium, the hydrophobic surface of the receiving medium may interact with the hydrophobic alkylgroup of the alkylphenolethoxylate. Due to the interaction between the alkylgroup and the receiving medium, the interaction between the phenolethoxylate and the host compound may weaken and consequently, the alkylphenolethoxylate may migrate out of the host compound. When the alkylphenolethoxylate is no longer bonded to the host compound, the alkylphenolethoxylate may regain its surface tension lowering property and may become active as a surface active agent again. Thus, when an ink composition comprising a host guest complex comprising an alkylphenolethoxylate is applied (e.g., printed) onto a receiving medium having a hydrophobic surface, the surface tension of the ink may lower. This may result in improved spreading of the ink on the receiving medium.

Octylphenolethoxylates are a species of the alkylethoxylate surface active agents and are commercially available as Triton® surfactants. The Triton® surfactants have an octyl substituent, in particular a 1,1,3,3-tetramethylbutyl substituent on the 4-position of the substituted phenol. Octylphenolethoxylates are known to be useful as surface active agents in aqueous inks. By further adding a host compound, such as a cyclic sugar derivative, e.g. a cyclodextrine to the ink, the surface active property may only be present after the ink has been applied onto the receiving medium and not (or to a lesser extent) in the print head or when jetted.

In an aspect of the invention, a method for preparing an ink composition according to the present invention is provided, the method comprising the steps of:
 providing an aqueous vehicle;
 adding the host compound, which is soluble (or dispersible) in the aqueous vehicle and has a cavity capable of hosting a guest compound, upon stirring;
 adding a surface active agent upon stirring, the surface active agent, having a first part and a second part, wherein the first part has an affinity towards the cavity of the host compound and is capable of forming a host-guest complex with the host compound and wherein the second part has a hydrophobic character and an affinity towards the hydrophobic surface of the receiving medium, wherein the affinity of the second part towards the hydrophobic surface of the receiving medium is higher than the affinity of the first part towards the cavity of the host compound.
 adding an aqueous dispersion of the water dispersible colorant upon stirring.

The steps are preferably carried out at a temperature in the range of 5° C. to 50° C., for example room temperature.

In an aspect of the invention, a method is provided for providing an image onto a receiving medium, the surface of the medium having a hydrophobic character, the method comprising the step of:
 applying droplets of an ink composition according to the present invention onto the hydrophobic surface of the receiving medium in a predefined pattern.

When an ink according to the present invention, comprising a host compound and a surface active agent that may bind to the cavity of the host compound via a first part of the surface active agent, is applied onto a receiving medium having a hydrophobic surface, then the host-guest complex formed between the host compound and the surface active agent may dissociate. Upon dissociating, free surface active agent is present in proximity of the surface of the receiving medium and the surface active agent may lower the surface tension at the solid liquid interface. Lowering of the surface tension at the solid liquid interface may result in better spreading of droplets.

Before the ink contacts the receiving medium (e.g. when the ink is in an ink reservoir or in the print head), the surface active agent may be complexed by the host compound and consequently, may not be active as a surface active agent. As a result, the surface tension of the ink in the print head or ink reservoir may be relatively high. Such relatively high surface tension is beneficial e.g. for jetting stability of the print head.

Thus, using an ink according to the present invention in a printing process, the surface tension of the ink composition may be tuned in-situ to adapt the surface tension to the phase of the printing process. In different phases of the printing process (e.g. jetting of droplets, landing of droplets on receiving medium) the surface tension is optimized.

DETAILED DESCRIPTION OF THE DRAWINGS

Figure 1:
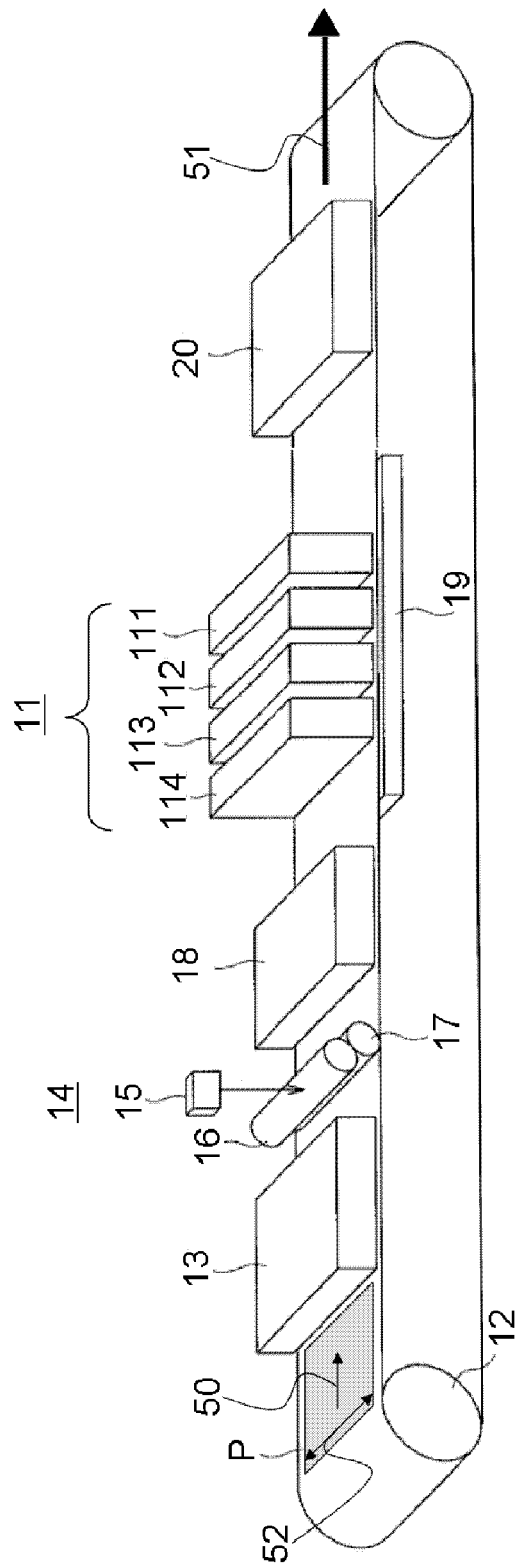
FIG. 1 shows a schematic representation of an inkjet printing system.

In the drawings, same reference numerals refer to same elements.

A printing process in which the inks according to the present invention may be suitably used is described with reference to the appended drawings shown in FIG. 1 and FIG. 2A-C. FIGS. 1 and 2A-C show schematic representations of an inkjet printing system and an inkjet marking device, respectively.

FIG. 1 shows a sheet of a receiving medium P. The image receiving medium P may be composed of e.g. paper, cardboard, label stock, coated paper, plastic, machine coated paper or textile. Alternatively, the receiving medium may be a medium in web form (not shown). The medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these, vacuum fixation is preferred.

The printing process as described below comprises of the following steps: media pre-treatment, image formation, drying and fixing and optionally post treatment.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the receiving medium P. Subsequently, the image receiving medium P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range. It is preferable to decrease the water content in an amount of 1.0 weight % to 30 weight % based on the total water content in the provided pre-treatment liquid provided on the receiving medium P.

To prevent the transportation mechanism 12 being contaminated with pre-treatment liquid, a cleaning unit (not shown) may be installed and/or the transportation mechanism may be comprised of multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium. The inkjet inks may be ink jet inks according to the present invention.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and Black). The nozzle pitch of each head is e.g. about 360 dpi. In the present invention, "dpi" indicates a dot number per 2.54 cm.

Figure 2A:
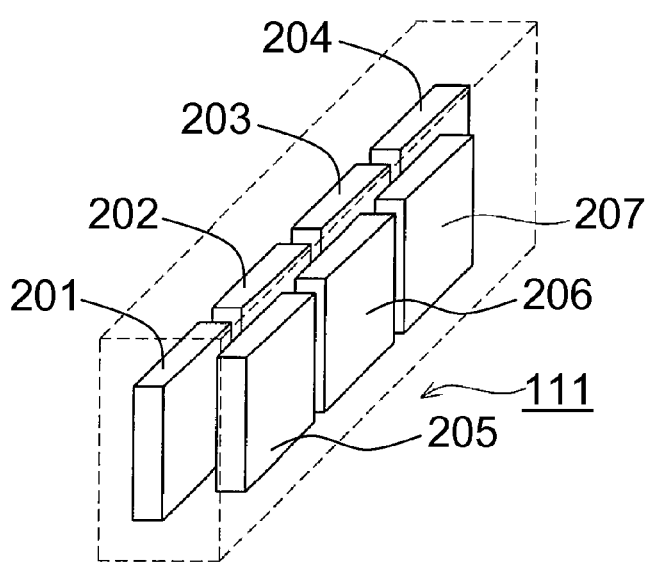
FIGS. 2A, 2B, and 2C show a schematic representation of an inkjet marking device: A) and B) assembly of inkjet heads; C) detailed view of a part of the assembly of inkjet heads.
Figure 2B:
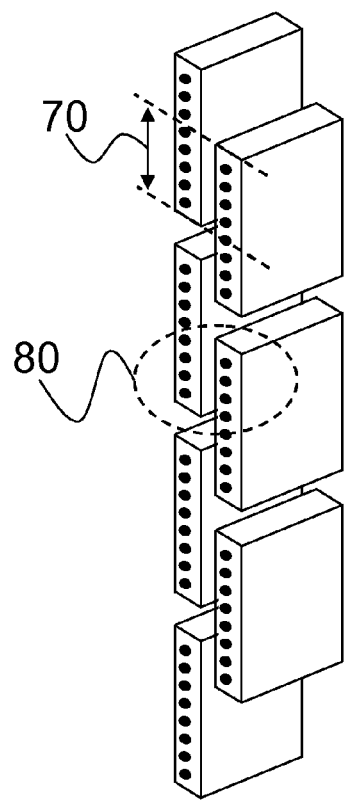
Figure 2C:
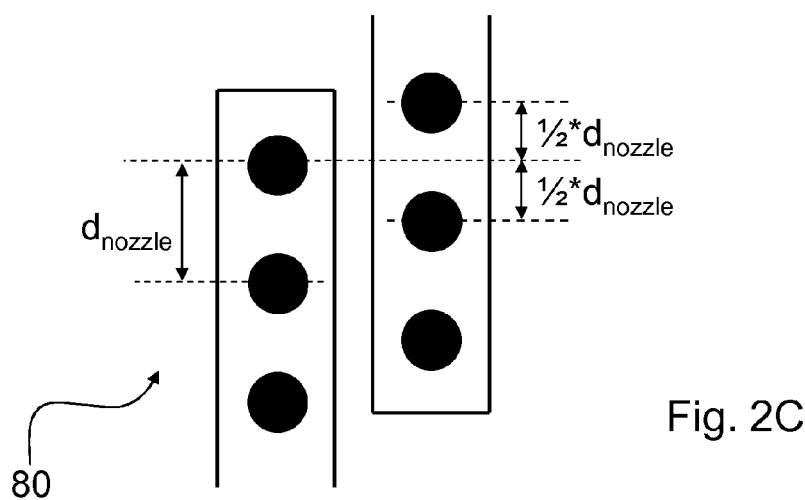

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single print head having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. print head) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

FIG. 1 shows that after pre-treatment, the receiving medium P is conveyed to an upstream part of the inkjet marking module 11. Then, image formation is carried out by each color ink ejecting from each inkjet marking device 111, 112, 113 and 114 arranged so that the whole width of the image receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 10° C. to 100° C. The temperature control device 19 may comprise heaters, such as radiation heaters, and a cooling means, for example a cold blast, in order to control the surface temperature of the receiving medium within said range. Subsequently and while printing, the receiving medium P is conveyed to the downstream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, such as water and/or organic co-solvents, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Post Treatment

To increase the print robustness or other properties of a print, such as gloss level, the print may be post treated, which is an optional step in the printing process. For example, the prints may be post treated by laminating the prints. Alternatively, the post-treatment step comprises a step of applying (e.g. by jetting) a post-treatment liquid onto the surface of the coating layer, onto which the inkjet ink has been applied, so as to form a transparent protective layer on the printed recording medium.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

Figure 4:
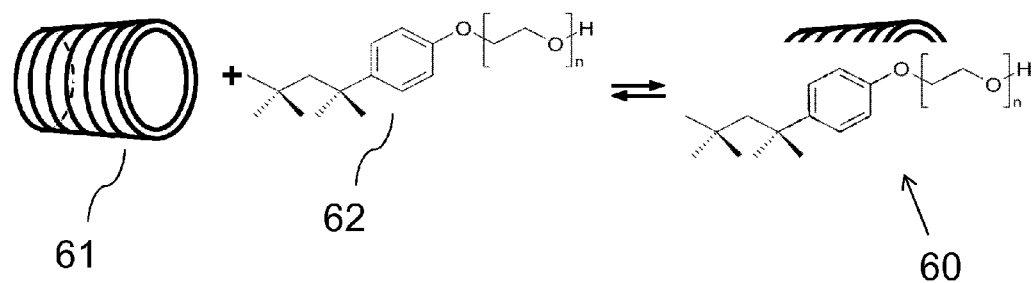
FIG. 4 shows a schematic representation of the formation of a host-guest complex between an octylphenolethoxylate surface active agent and a host compound.

FIG. 4 shows a schematic representation of the formation of a host-guest complex 60. The host-guest complex 60 is in equilibrium with the free host compound 61 and the free octylphenolethoxylate 62. Depending e.g. on the concentrations of the respective compounds, the equilibrium may lie at the left or at the right. For example, if the concentrations of the host compound 61 and the free octylphenolethoxylate 62 is low, the equilibrium will lie at the left.

Experiments and Examples

Materials

Latex U9800, a polyester polyurethane copolymer, was obtained from Alberdingk Boley GmbH. As a pigment, Pro-Jet Black APD 1000 was used, which is obtained from Fujifilm. Triethylphosphate, 1,2-propanediol, 1,2-hexanediol, 1,6-hexanediol and propoxylated β-cyclodextrine were obtained from Sigma-Aldrich. As a surfactant, Triton® X-45 was used, which is obtained from Sigma-Aldrich.

All materials used in the examples are used as obtained from the supplier, unless otherwise stated.

Methods

Surface Tension

The surface tension is measured using a Sita bubble pressure tensiometer, model SITA online t60, according to the (maximum) bubble pressure method. The surface tension of the liquids to be tested (e.g. inks according to the present invention) is measured at 30° C. unless otherwise indicated. The static surface tension is determined at a frequency of 0.1 Hz. The dynamic surface tension at 10 Hz.

Wetting of Surface of Receiving Medium

An ink composition was rodcoated onto a receiving medium to obtain a layer of 8 μm thickness. As receiving medium, IJM614 or MP12000 was used. IJM614 is a polymeric vinyl white medium, obtainable from Océ.

Depending upon the surface tension at the liquid solid interface between ink and receiving medium, wetting or dewetting of the receiving medium takes place. Wetting of the receiving medium corresponds to a low surface tension, whereas dewetting of the receiving medium corresponds to a high surface tension.

(De)wetting of the receiving medium was judged optically.

EXAMPLES

Several ink compositions were prepared. Ink compositions Ex 1 and Ex 2 comprise propoxylated β-cyclodextrine and are inks according to the present invention, whereas ink compositions CE 1, CE 2 and CE 3 are not ink compositions according to the present invention.

Production Example Ex 1

Ink composition Ex 1 was prepared by adding 5 gr of triethylphosphate, 2.5 gr of 1,2-propanediol, 1 gr of 1,2-hexanediol and 2.5 gr of 1,6-hexanediol to water upon stirring at room temperature. Subsequently, 1 gr of propoxylated β-cyclodextrine was added upon stirring. Next, 0.5 gr of Triton® X-45 was added upon stirring.

Finally, 14.3 gr of an aqueous dispersion of Pro-Jet Black® APD pigment, comprising 14 wt % of pigment, was added upon stirring, as well as 14.3 gr of an aqueous dispersion of Latex U9800, comprising 35 wt % of latex particles.

Production Example Ex 2

Production example Ex 2 was prepared by adding 10 gram of 1,2-propanediol, 5 grams of glycerol to water upon stirring at room temperature. Subsequently, 2 gr of propoxylated β-cyclodextrine was added upon stirring. Next, 0.5 gr of Triton® X-45 was added upon stirring. Finally, 3.7 gr of an aqueous dispersion of Pro-Jet Cyan APD® pigment, comprising 14 wt % of pigment, was added upon stirring. In addition, 7.4 gr of an aqueous dispersion of Latex U9800, comprising 35 wt % of latex, was added upon stirring.

Comparative production example CE 1 was prepared analogously to ink composition Ex 1, but no cyclodextrine was used.

Comparative examples CE 2 and CE 3 were prepared analogously to Ex 2, but no Triton® X-45 (CE 2) or no cyclodextrine (CE 3) was used.

TABLE 1

Ink compositions

| Component | Ex 1 | Ex 2 | CE 1 | CE 2 | CE 3 |
|---|---|---|---|---|---|
| triethylphosphate | 5 | 0 | 5 | 0 | 0 |
| Latex U9800 | 5.0 | 2.6 | 5.0 | 2.6 | 2.6 |
| pigment | 2.0 | 0.5 | 2.0 | 0.5 | 0.5 |
| Propoxylated β-cyclodextrine | 1 | 2 | 0 | 2 | 0 |
| 1,2-propanediol | 2.5 | 10 | 2.5 | 10 | 10 |
| 1,2-hexanediol | 1 | 0 | 1 | 0 | 0 |
| 1,6 hexanediol | 2.5 | 0 | 2.5 | 0 | 0 |
| glycerol | 0 | 5 | 0 | 5 | 5 |
| Triton X-45 | 0.5 | 0.5 | 0.5 | 0 | 0.5 |
| water | 28 | 29.4 | 29 | 29.9 | 31.4 |

Comparison Experiments
Surface Tension

Figure 3A:
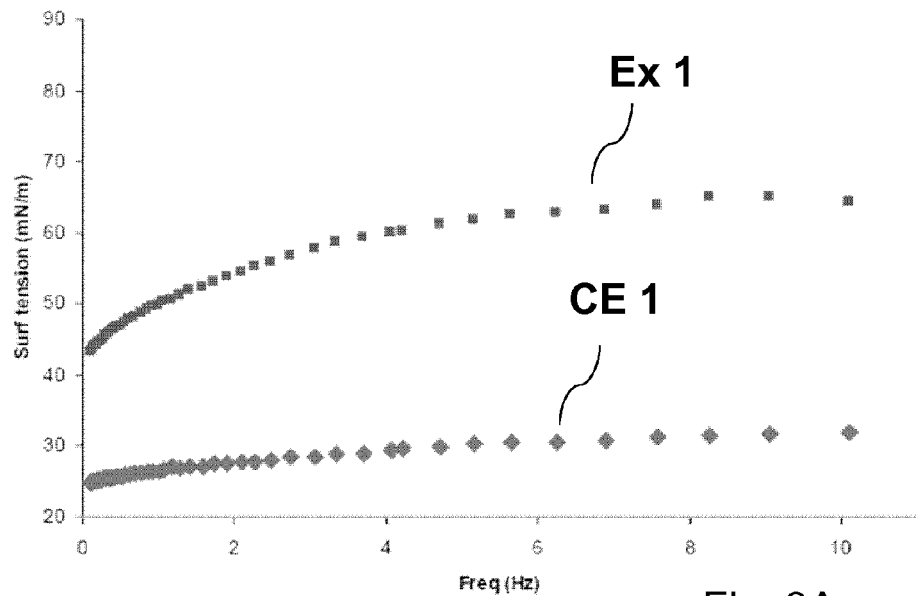
FIG. 3A shows the surface tension of ink compositions Ex 1 and CE 1 as a function of bubble frequency.

FIG. 3A shows the surface tensions of ink compositions Ex 1 and CE 1 measured at different frequencies. From FIG. 3A, it can be observed that the surface tension measured at 0.1 Hz (static surface tension) as well as the surface tension measured at 10 Hz (dynamic surface tension) of Ex 1 are higher than the respective surface tensions for CE 1. It is known that the addition of a surface active agent, such as Triton® X-45 lowers the surface tension of an aqueous composition. The ink composition Ex 1 which comprises Triton® X-45 as well as the cyclodextrine compound has a higher surface tension than ink composition CE 1, which comprises Triton® X-45, but not the cyclodextrine compound. Hence, it can be observed from FIG. 3A that the surface tension of ink composition Ex 1 is not lowered, or less lowered compared to ink composition CE 1, which is believed to be due to complexation of Triton® X-45 by the cyclodextrine compound.

Figure 3B:
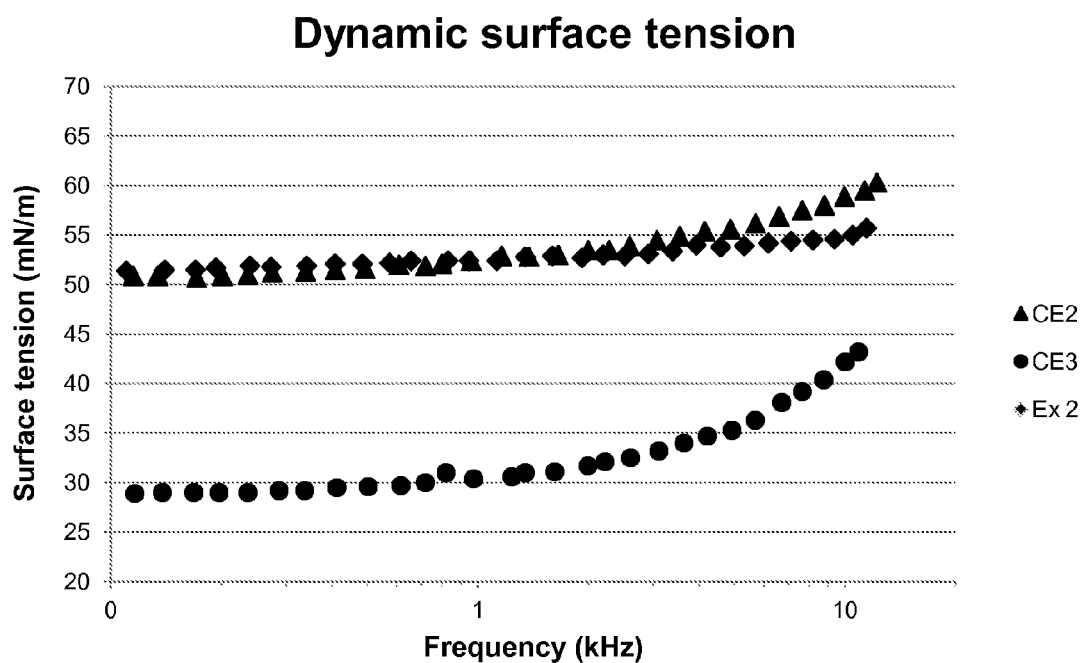
FIG. 3B shows the surface tension of ink compositions Ex 2, CE 2 and CE 3 as a function of bubble frequency.

FIG. 3B shows the surface tensions of ink compositions Ex 2, CE 2 and CE 3 measured at different frequencies. From FIG. 3B, it can be observed that the surface tension measured at 0.1 Hz (static surface tension) as well as the surface tension measured at 10 Hz (dynamic surface tension) of Ex 2 and CE 2 are higher than the respective surface tensions for CE 3. It is known that the addition of a surface active agent, such as Triton® X-45 lowers the surface tension of an aqueous composition. The ink composition Ex 2 which comprises Triton® X-45 as well as the cyclodextrine compound has a high surface tension. Also ink composition CE 2, which comprises cyclodextrine, but does not comprise Triton® X-45, has a high surface tension. In contrast, ink composition CE 3, which does comprise Triton X-45, but does not comprise cyclodextrine, has a low surface tension. A higher surface tension is believed to improve the jettability of the ink. Inks having a low surface tension are less jettable.

Hence, it can be observed from FIG. 3B that the surface tension of ink composition Ex 2 is comparable to the surface tension of CE 2, which does not comprise Triton® X-45. Hence, both ink compositions Ex 2 and CE 2 are believed to be well jettable. However, ink composition CE 3, which does comprise Triton® X-45, but not cyclodextrine, is believed to be badly jettable.

Wetting of Surface of Receiving Medium

Ink compositions Ex 1, Ex 2, CE 1, CE 2 and CE 3 were rodcoated onto a sheet of IJM614, yielding a layer of 8 μm thickness.

The surface tension of Ex 1, Ex 2, and CE 2 in the bulk is higher than the surface tension of CE 1 and CE 3 in the bulk, as was discussed above with reference to FIG. 3A and FIG. 3B. For example, at a bubble frequency of 6 Hz, the surface tension of Ex 1 is about 60 mN/m, whereas the surface tension of CE 1 in the bulk is about 30 mN/m at the same bubble frequency.

Based on these values, it would be expected that upon rodcoating, the image provided by ink composition Ex 1, Ex 2, and CE 2 would show dewetting, whereas the image provided by CE 1 and CE 3 would show wetting behavior. The observed wetting behavior of the different ink compositions is summarized in table 2.

TABLE 2 wetting behavior

| Ink composition | Ex 1 | Ex 2 | CE 1 | CE 2 | CE 3 |
|---|---|---|---|---|---|
| Wetting behavior | Wetting | wetting | Non-wetting | Non-wetting | Wetting |

Ink compositions CE 1 and CE 2 showed non-wetting behavior. This was expected based on the measured surface tension of these ink compositions. Non-wetting behavior is unwanted when applying an ink onto a recording medium; it may cause print artifacts. Ink compositions CE 3 showed wetting behavior, which was expected based on the measured surface tension. Ink compositions Ex 1 and Ex 2 have a high surface tension in the bulk. However, when Ex 1 and Ex 2 were tested, both images showed wetting behavior. This corresponds to a low surface tension for both ink compositions. It is believed that this low surface tension in Ex 1 and Ex 2, like in CE 1 and CE 2, is caused by the surface active agent Triton X-45 and that, when applying the ink composition Ex 1 or Ex 2 onto a receiving medium, this surface active agent dissociates from the cyclodextrine host, thereby lowering the surface tension of the ink and improving the wetting behavior of the ink composition.

Ex 1 and Ex 2 have a high surface tension in the bulk and are therefore suitable to be jetted using an inkjet print head. Still, they show wetting behavior when applied onto a receiving medium. The ink compositions CE 1, CE 2 and CE 3 shows either high surface tension, which corresponds to good jettability or good wettability. None of the comparative examples CE 1, CE 2 and CE 3 combines good wettability with high surface tension in the bulk.

Figure 5:
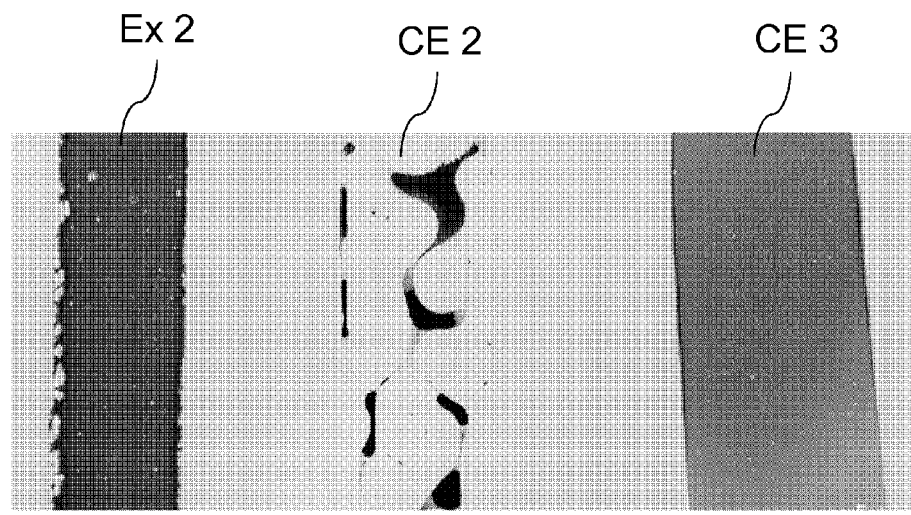
FIG. 5 shows samples prepared by applying ink compositions Ex 2, CE 2 and CE 3 onto a recording medium.

A second rodcoating experiment was performed using MPI2000 as the receiving medium. Ink compositions Ex 2, CE 2 and CE 3 were tested in this experiments. The results are shown in FIG. 5. In FIG. 5, it can be observed that ink compositions Ex 2 and CE 3 show good wettability, whereas CE 2 shows poor wettability.

Hence, ink composition Ex 2 combines good wettability with high surface tension, providing good jetting properties. In contrast the ink compositions CE 2 and CE 3 show only one of these properties.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

The invention claimed is:

1. An ink jet composition for applying an image onto a receiving medium, said receiving medium comprising a hydrophobic surface, the ink jet ink composition comprising:
    a pigment;
    an aqueous vehicle;
    a host compound, which is a cyclodextrine compound, is soluble or dispersible in the aqueous vehicle and has a cavity capable of hosting a guest compound;
    a surface active agent, having a first part and a second part, wherein the first part has an affinity towards the cavity of the host compound and is capable of forming a host-guest complex with the host compound and wherein the second part has a hydrophobic character and an affinity towards the hydrophobic surface of the receiving medium, wherein the affinity of the second part towards the hydrophobic surface of the receiving medium is higher than the affinity of the first part towards the cavity of the host compound, and
    wherein the surface active agent is an alkylphenolethoxylate and wherein the alkyl group of the alkylphenolethoxylate ahs 6-30 carbon atoms.

2. The ink jet ink composition according to claim 1, wherein the ink jet ink composition further comprises a water dispersible resin.

3. A method for providing an image onto a receiving medium, the surface of the medium having a hydrophobic character, the method comprising the step of:
    applying droplets of the ink jet ink composition according to claim 1 onto the hydrophobic surface of the receiving medium in a predefined pattern.

4. A method for preparing the ink jet ink composition according to claim 1, the method comprising the steps of:
    providing an aqueous vehicle;
    adding the host compound, which is a cyclodextrine compound, is soluble or dispersible in the aqueous vehicle and has a cavity capable of hosting a guest compound, upon stirring;
    adding a surface active agent upon stirring, the surface active agent, having a first part and a second part, wherein the first part has an affinity towards the cavity of the host compound and is capable of forming a host-guest complex with the host compound and wherein the second part has a hydrophobic character and an affinity towards the hydrophobic surface of the receiving medium, wherein the affinity of the second part towards the hydrophobic surface of the receiving medium is higher than the affinity of the first part towards the cavity of the host compound;
    adding an aqueous dispersion of the water dispersible colorant upon stirring, and
    wherein the surface active agent is an alkylpjhenolethoxylate and wherein the alkyl group of the alkylphenolethoxylate has 6-30 carbon atoms.

* * * * *